May 23, 1944.   J. E. McLAUGHLIN   2,349,741
DRILL SOCKET CONSTRUCTION
Filed Nov. 8, 1943
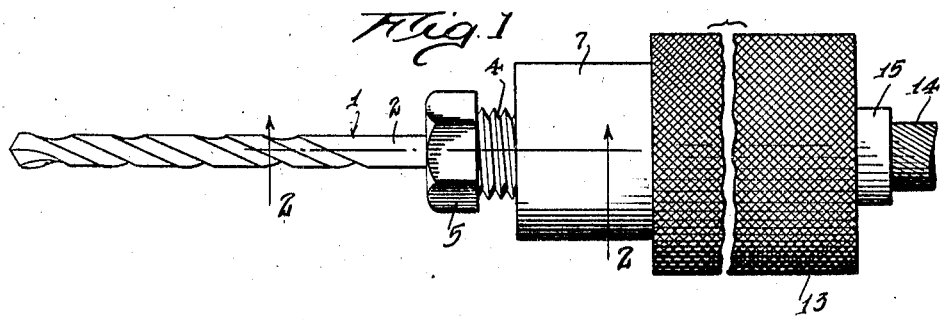
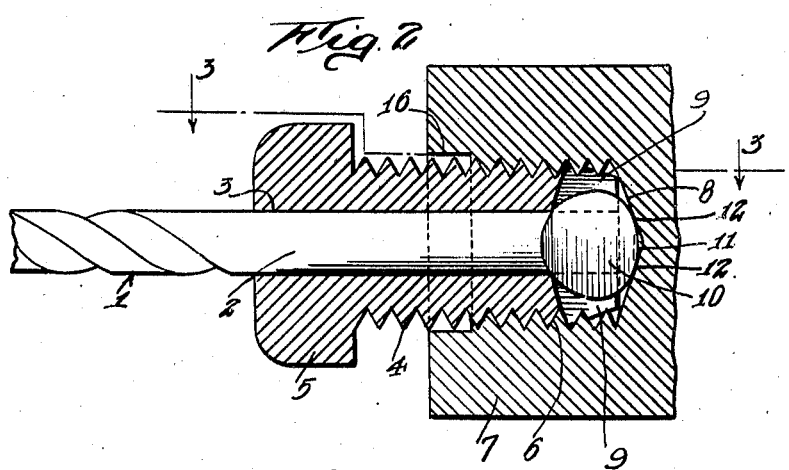
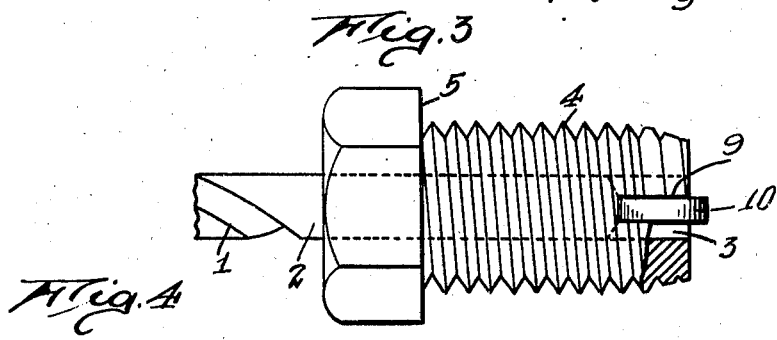
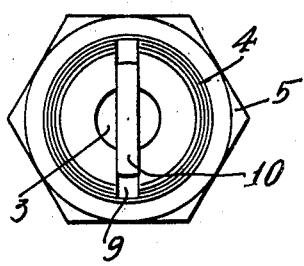
Inventor
John E. McLaughlin
By Lyon & Lyon
Attorneys Patented May 23, 1944

2,349,741

UNITED STATES PATENT OFFICE 2,349,741

DRILL SOCKET CONSTRUCTION

John Emerson McLaughlin, Torrance, Calif., assignor to Doak Aircraft Co. Inc., Torrance, Calif., a corporation of California Application November 8, 1943, Serial No. 509,386

4 Claims. (Cl. 279—9)

This invention relates to a construction for holding and rotating a drill, and while the invention is applicable to drills of larger size, it is intended particularly for use in connection with small hand drills. One type of these drills is known as "snake drills" in which the operator holds a drill casing in his hand, which carries a rotary member or head that is driven by a flexible shaft. These drill heads are of simple construction and do not include a chuck for clamping the drill shank.

One of the objects of the present invention is to provide a simple drill socket construction for holding and rotating the round shank of such a drill.

Another object of the invention is to provide a socket construction of this kind with means for holding and rotating the drill shank, which will operate as an adapter, enabling a plurality of adapters of different internal diameter to be employed for holding drills of different sizes.

Another object of the invention is to provide a simple construction, whereby the adapter will function to impart the rotary movement to the drill, and at the same time clamp the rear end of the drill shank against the rotary driven member to enable the rotary driven member to resist the longitudinal thrust of the drill when passing through the work.

Other objects and advantages will appear hereinafter.

The invention consists in the novel parts and combinations of parts to be described hereinafter, all of which contribute to produce an efficient drill socket construction.

In the drawing:

Figure 1 is a side elevation of a snake drill casing, broken away, and illustrating the drill attached to the same in accordance with my invention.

Figure 2 is a longitudinal section, taken about on the line 2—2 of Figure 1, but upon an enlarged scale, the right end of the rotary drilling member being broken away; the forward end of the drill is also broken away.

Figure 3 is a plan of the drill shank-holder, or adapter, as viewed from the location of the line 3—3 in Figure 2; the forward portion of the drill being broken away, and also a portion of the rear end of the shank-holder or adapter, to further illustrate its details.

Figure 4 is an end elevation of the inner end of the shank-holder or adapter, and illustrating the driving end or fin of the drill-shank fitted into the adapter. These two views, Figures 3 and 4, show the adapter and drill ready to be applied to the rotary driven member to rotate the drill through the agency of its shank.

In practicing this invention, I provide a shank-holder that has an axial bore through it to fit the particular diameter of drill that is to be mounted in the drilling head, and this shank-holder is provided with means for removably attaching it to the rotary driven member which imparts the rotary movement to the drill-shank. This connection between these parts is preferably a threaded connection. When the shank-holder is applied to the threads of the rotary driven member and is fastened up into position, it becomes firmly seated and clamps the rear end or edge of the drill-shank against the socket in the rotary driven member. I provide correlated means, such as a slot and projection between the inner end of the drill-shank and the shank-holder for imparting the rotary movement to the drill through the shank-holder. This arrangement enables me to employ a very simple construction for the socket in the rotary driven member.

In the drawing, I illustrate a preferred embodiment of the invention, in which 1 indicates a small snake drill having a round shank 2 of the same diameter as the drill body. This round shank 2 fits neatly into an axial bore 3 formed in a shank-holder or adapter 4. This adapter is preferably formed with an angular or nut-form head 5, which enables the adapter to be screwed into a threaded socket 6 in the forward end of a rotary driven member 7.

The inner end of the threaded socket in the driven member 7 is formed with a seat face 8 which is preferably of slightly conical form.

In order to enable the adapter 4 to impart rotary movement to the drill 1, I prefer to provide its wall with a substantially radial slot and this is preferably accomplished by employing a diametrically disposed slot 9 extending through the wall of the adapter at two diametrically opposite points, in this way forming two slots, both of which function so that a turning couple results.

The inner end of the shank 2 is provided with a projection to extend into the diametrical slot 9 and preferably this is in the form of a flattened fin 10 that is integral with the shank 2 and of a width to fit neatly into the slot 9 (see Fig. 3). The fin 10 preferably has substantially the outline illustrated in Fig. 2, its rear edge 11 being symmetrical with respect to its axis on the fin so that two points of tangency 12 result where this back edge of the fin rests against the conical face.

The rotary driven member 7 is mounted for rotation in a casing or handle 13 which the driller holds in his hands when using the drill, and at the rear end of this casing 13 a flexible driving cable or shaft 14 is connected. This may be connected with a suitable bushing 18 or connection that is coaxial with the driven member.

As is well-known, small drills are subject to considerable breakage and the present construction is most advantageous under these circumstances, because the adapter 4 can be quickly unscrewed and the entire drill inserted from its inner end for attachment to the driven member. In order to facilitate the insertion of the threads on the adapter into the threads of the socket, a counterbore 16 may be formed in the forward end of the rotary member 7. This counterbore is just slightly larger in diameter than the diameter of the threaded adapter and deep enough to take two threads of the adapter. Hence when the adapter is inserted in this counterbore, it will be properly aligned to catch into the starting point of the threads 6 of the socket.

What I claim is:

1. In a drill socket construction for holding and rotating the round shank of a drill, the combination of a threaded adapter operating as a shank-holder having an axial bore therethrough; the inner end of said adapter having a substantially radial slot formed in the wall thereof, a drill insertable into said adapter from the inner end thereof, and having a shank fitting the diameter of said bore; the inner end of said shank having a lateral projection received in said slot for imparting rotary movement from the adapter to the drill; and a rotary threaded driven member mounted to rotate on its own longitudinal axis, having a socket in its forward end to receive the inner end of the adapter, and having a seat face at its inner end to engage the inner end of the shank of the drill to resist the longitudinal thrust thereof.

2. In a drill socket construction for holding and rotating the round shank of a drill, the combination of a threaded adapter operating as a shank-holder and having an axial bore therethrough; the inner end of said adapter having a diametrically disposed slot formed in the wall thereof, a drill insertable into said adapter from the inner end thereof, and having a shank fitting the diameter of said bore; the inner end of said shank having a diametrically disposed fin received in said slot for imparting rotary movement from the adapter to the drill; and a rotary threaded driven member mounted to rotate on its own longitudinal axis, having a socket in its forward end to receive the inner end of the adapter, and with a seat face at its inner end to engage the inner end of the shank of the drill to resist the longitudinal thrust thereof.

3. In a drill socket construction for holding and rotating the round shank of a drill, the combination of a threaded adapter operating as a shank-holder and having an axial bore therethrough, the inner end of said adapter having a diametrically disposed slot formed in the wall thereof, a drill insertable into said adapter from the inner end thereof, and having a shank fitting the diameter of said bore; the inner end of said shank having a diametrically disposed fin received in said slot for imparting rotary movement from the adapter to the drill; and a rotary threaded driven member mounted to rotate on its own longitudinal axis, having a socket in its forward end to receive the inner end of the adapter, and having a substantially conical seat face at the bottom of the socket; the adjacent edge of said diametrically disposed fin fitting against said conical seat face to impart the longitudinal thrust of the drill to said seat face.

4. In a drill socket construction for holding and rotating the round shank of a drill, the combination of an internal threaded adapter operating as a shank-holder, and having an axial bore therethrough; the inner end of said adapter having a diametrically disposed slot formed in the wall thereof; a drill insertable into said adapter from the inner end thereof, and having a shank fitting the diameter of said bore; the inner end of said shank having a diametrically disposed fin received in said slot for imparting rotary movement from the adapter to the drill; and a rotary driven member mounted to rotate on its own longitudinal axis, having a threaded socket in its forward end to receive the inner end of the adapter, and having a seat face at the inner end of the socket to engage the adjacent edge of the fin to resist longitudinal thrust thereof.

JOHN EMERSON McLAUGHLIN.